United States Patent [19]

Desurvire et al.

[11] Patent Number: 4,963,832
[45] Date of Patent: Oct. 16, 1990

[54] ERBIUM-DOPED FIBER AMPLIFIER COUPLING DEVICE

[75] Inventors: Emmanuel Desurvire; Randy C. Giles, both of Middletown; Matthew S. Whalen, Rumson, all of N.J.

[73] Assignee: AT&T Bell Laboratories, Murray Hill, N.J.

[21] Appl. No.: 390,864

[22] Filed: Aug. 8, 1989

[51] Int. Cl.$^5$ .......................... G02B 6/26; H01S 3/094
[52] U.S. Cl. .................................. 330/4.3; 350/96.15
[58] Field of Search ................ 330/4.3; 455/610, 612; 350/311, 96.15, 96.2

[56] References Cited

U.S. PATENT DOCUMENTS

| | | | |
|---|---|---|---|
| 3,949,315 | 4/1976 | Zeidler | 330/4.3 |
| 3,950,707 | 4/1976 | Hill et al. | 330/4.3 |
| 4,554,510 | 11/1985 | Shaw et al. | 330/4.3 |
| 4,557,553 | 12/1985 | McLandrich | 350/96.15 |
| 4,674,830 | 6/1987 | Shaw et al. | 350/96.15 |
| 4,712,075 | 12/1987 | Snitzer | 330/4.3 |

OTHER PUBLICATIONS

Whalen et al; Effectively Nonreciprocal . . . Coupler; Electron Lett., vol. 21, #5, pp. 175-176; 2/28/85.
Morkel, P. R.; An All Fibre, Diode Pumped . . . Delay Line; IRR Collag. an All Fibre Devices); pp. 12/1-4, 6/3/88; Abst. only.
Desurvire et al; High-Gain Erbium-Doped . . . For Amplifiers; Opt. Lett., vol. 12, #11, pp. 888-890, 11/87; Abst. only.
Whalen et al; Demonstration of . . . Directional Coupler; Electron. Lett., vol. 22, #12, pp. 681-682, 6/5/86.
"Analysis of a Tunable Single Mode Optical Fiber Coupler", by M. J. F. Digonnet, et al; IEEE Journal of Quantum Electronics, vol. QE-18, No. 4, Apr. 1982.
"Wavelength-Selective Directional Coupler Made of Nonidentical Single-Mode Fibers", by R. Zengerle, et al; Journal of Lightwave Technology, vol. Lt-4, No. 7, Jul. 1986.
"Review of Rare Earth Doped Fiber Lasers and Amplifiers", by P. Urquhart, IEE Proceedings, vol. 135, Pt. J. No. 6, Dec., 1988.

(List continued on next page.)

Primary Examiner—Nelson Moskowitz
Attorney, Agent, or Firm—Eli Weiss

[57] ABSTRACT

This invention is directed toward reducing substantially the loss incurred when two optical fibers of different mode diameters are coupled together. In this invention, the coupling of one fiber to that of another where the fibers are of different mode diameters is not with a tapered fusion, core-to-core splice, but with an evanescent field fiber coupler. Briefly, to achieve amplification of a weak optical signal, an amplifying fiber is inserted into the system at one or a plurality of locations. More specifically, at a desired location, the transmission fiber is severed to provide two sections and the severed sections are transversely coupled to the amplifying fiber. The weak signal from the first section of the transmission fiber is coupled into the amplifying fiber via a first evanescent field type of fiber coupler; and the amplified signal is coupled from the amplifying fiber to the second section of the transmission fiber via a second evanescent field type of fiber coupler. The first evanescent field type of fiber coupler is designed to couple substantially all of the signal energy from the first section of the transmission fiber to the amplifying fiber and to couple substantially none of the laser diode pump signal or energy from the amplifying fiber to the transmission fiber. The second evanescent field type of fiber coupler is designed to couple substantially all of the signal energy in the amplifying fiber to the transmitting fiber and substantially no laser diode pump energy is transferred from the amplifying fiber to the transmission fiber. Either or both cut ends of the transmission fiber can be coupled to monitor devices to detect and determine the value of the signal being coupled into and/or out of the amplifying fiber to control, for example, the gain of the amplifying fiber.

3 Claims, 2 Drawing Sheets

OTHER PUBLICATIONS

"Wavelength Selective Distributed Coupling Between Single Mode Optical Fibers for Multiplexing", by Parriaux et al., J. Opt. Communications 2 (1981) 3, pp. 105-109.

"Bandwidth of Directional-Coupler Wavelength Filters Mode of Dissimilar Optical Fibers"by Leminger et al., Elect. Letters, Feb. 26, 1987, vol. 23, No. 5, pp. 241-242.

"In-Line Optical Fibre Filter for Wavelength Multiplexing", by Whalen et al., Electronics Letters, Aug. 15, 1985, vol. 21, No. 17, pp. 724-725.

"High-Gain Erbium-Doped Traveling-Wave Fiber Amplifier" by Desurvire et al., Optics Letters, vol. 12, No. 11, Nov. 1987, pp. 888-890.

"Gain Saturation Effects in High-Speed Multichannel Erbium-Doped Fiber Amplifiers at Lambda=1.53 mu m", by Desurvire et al., Journal of Lightwave Technology, vol. 7, No. 12, Dec. 1989, pp. 2095-2104.

"Fiber Amplifiers for Optical Communications", by E. Dsurvire, Proceedings of the International Conference on Lasers, 1988, pp. 496-503.

"2-Gbit/s Signal Amplification at Lambda=1.53 mu m in an Erbium-Doped Single-Mode Fiber Amplifier", by Giles et al., Journal of Lightwave Technology, vol. 7, No. 4, Apr. 1989, pp. 651-656.

"Efficient Erbium-Doped Fiber Amplifier at a 1.53 mu m Wavelength with a High Output Saturation Power", by Desurvire et al., Optics Letters, vol. 14, No. 22, Nov. 15, 1989, pp. 1266-1268.

"Noise Performance of Erbium-Doped Fiber Amplifier Pumped at 1.49 mu m, and Application to Signal Preamplification at 1.8 Gbits/s" by Giles et al., IEEE Photonics Technology Letters, vol. 1, No. 11, Nov. 1989, pp. 367-369.

4,963,832

ERBIUM-DOPED FIBER AMPLIFIER COUPLING DEVICE

TECHNICAL FIELD

This invention relates generally to optical communication systems and more particularly to coupling an optical fiber amplifier of one mode dimension to an optical fiber communication system having a fiber of a second mode dimension.

BACKGROUND OF THE INVENTION

There is considerable interest in using rare earth doped fibers to amplify weak optical signals for both local and trunk optical telecommunications networks. The rare earth doped optical amplifying fibers are low cost, have low noise properties, have a relatively large bandwidth which is not polarization dependent, have no crosstalk problems, and have relatively low insertion losses at the wavelengths which are used in optical communications. In use, rare earth doped optical fiber amplifiers are coupled end-to-end to an optical communication fiber and are normally transversely coupled, through a directional coupler to a laser diode pump so that a weak optical input signal at some wavelength within the rare earth doped optical fiber amplifer experiences a gain. The directional coupler is designed to have a high coupling ratio at the pump wavelength and low coupling ratio at the signal wavelength. The pump light may be made to propagate either co-directionally or contra-directionally with respect to the signal, according to whether the unconverted pump light can be more conveniently filtered at the transmitter or the receiver. The core diameters and refractive index profiles determines the mode sizes of the undoped transmission fiber and of the doped amplifying fiber and, therefore, the fibers will not necessarily be the same. In the transmission fiber the primary constraint is the requirement of waveguide dispersion while in the amplifying fiber there exists the need to maximize the overlap of the pump and signal modes. Because the amplifying fiber can have a mode size which is different from that of the transmission fiber, the losses at the splice due to mode mismatch can be quite large. To reduce this loss at the core-to-core splice between the two fibers, it has been proposed that the fusion splice be tapered.

SUMMARY OF THE INVENTION

This invention is directed toward reducing substantially the loss incurred when two optical fibers of different mode diameters are coupled together. In this invention, the coupling of one fiber to that of another where the fibers are of different mode diameters is not with a tapered fusion, core-to-core splice, but with an evanescent field fiber coupler. Briefly, to achieve amplification of a weak optical signal, an amplifying fiber is inserted into the system at one or a plurality of locations. More specifically, at a desired location, the transmission fiber is severed to provide two sections and the severed sections are tranversely coupled to the amplifying fiber. The weak signal from the first section of the transmission fiber is coupled into the amplifying fiber via a first evanescent field type of fiber coupler; and the amplified signal is coupled from the amplifying fiber to the second section of the transmission fiber via a second evanescent field type of fiber coupler. The first evanescent field type of fiber coupler is designed to couple substantially all of the signal energy from the first section of the transmission fiber to the amplifying fiber and to couple substantially none of the laser diode pump signal or energy from the amplifying fiber to the transmission fiber. The second evanescent field type of fiber coupler is designed to couple substantially all of the signal energy in the amplifying fiber to the transmitting fiber and substantially no laser diode pump energy is transferred from the amplifying fiber to the transmission fiber. Either or both cut ends of the transmission fiber can be coupled to monitor devices to detect and determine the value of the signal being coupled into and/or out of the amplifying fiber to control, for example, the gain of the amplifying fiber.

DETAILED DESCRIPTION

Figure 1:
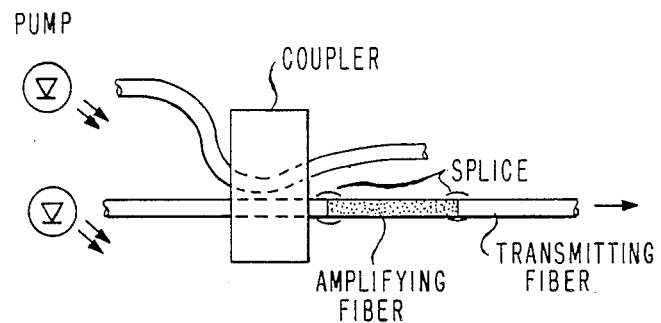
FIGS. 1—3 are schematic diagrams of prior art arrangements of three fiber laser amplifier applications.
Figure 2:
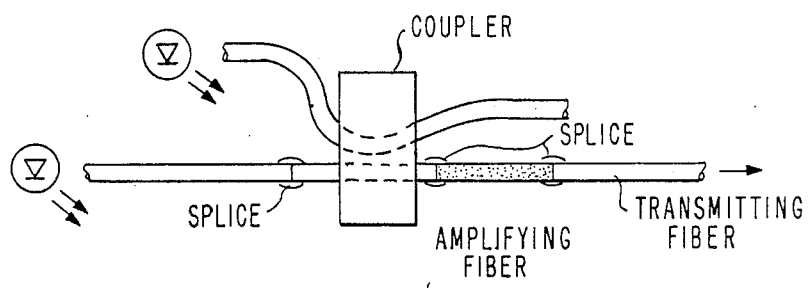
Figure 3:
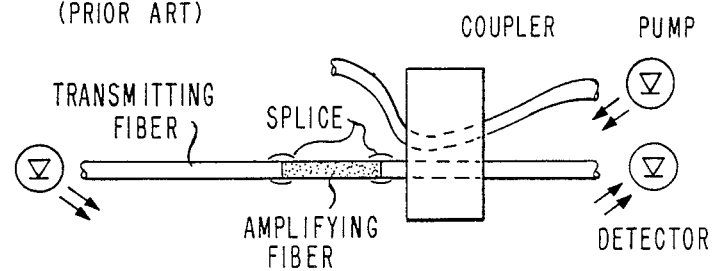

Referring to FIGS. 1—3, there are illustrated schematics of prior art arrangements of three amplifying fibers coupled to and optical fiber transmission system. Depending upon the requirements of a system, the amplifying fiber can be located at the transmitting end, in the middle of the transmission fiber or at the receiver end.

FIG. 1 illustrates a rare earth doped amplifying fiber being used to increase the output from a weak source prior to transmission in a large system fiber.

FIG. 2 illustrates what is considered to be the most important use where the amplifier is inserted at one or more locations in the middle of a system. FIG. 3 illustrates a doped amplifying fiber being used to amplify a weak signal to a value which can be detected by a receiver. While not illustrated, it is to be noted that optical isolators with small insertion loss may be required, in certain applications, on one or each side of the fiber system, i.e. on the signal laser side, the detector side, or on the transmission fiber. In each instance, the doped amplifying fiber is coupled by a core-to-core fusion splice to the transmission fiber. A laser diode pump is coupled to the optical fiber to supply the required pump energy to the amplifying fiber via a dichroic coupler. Clearly, in the prior art device, the amplifying fiber is coupled to the transmission fiber via fusion splices and the pump energy is supplied to the amplifying fiber via the optical fiber and dichroic coupler.

Figure 4:
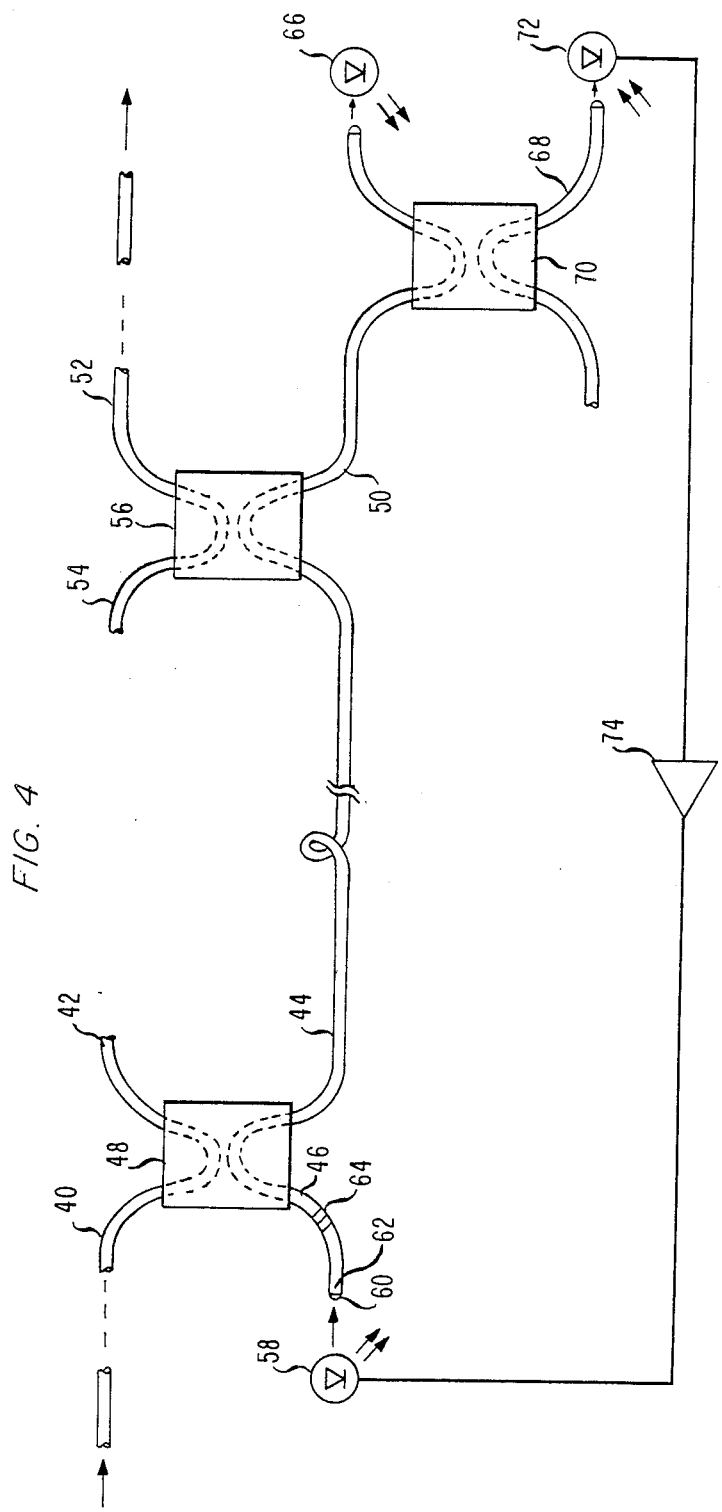
FIG. 4 is a schematic diagram of an optical transmission system in accordance with the principles of the invention.

Referring now to FIG. 4, there is illustrated structure in accordance with the principles of the invention. A first section 40 of an optical transmission fiber coupled to receive and carry an optical signal is coupled at end 42 to the end 46 of a doped amplifying fiber 44 via an evanescent field type of coupler such as dichroic coupler 48. The other end 50 of the doped amplifying fiber 44 is coupled at or near the end 54 of a second section 52 of the optical transmission fiber via an evanescent field type of coupler such as dichroic coupler 56.

The dichroic coupler is comprised of two different fibers, one fiber being the transmission fiber 40 and the other fiber being the doped amplifying fiber 44. The refractive index and core size of the amplifying fiber is designed to optimize the overlap between pump and lasing modes and to allow coupling between the amplifying fiber and transmission fiber only at the signal wavelength. Dichroic couplers are described in the Publications "Analysis of a Tunable Single Mode Optical Fiber Coupler" by Michel J. F. Digonnet et al, IEEE Journal of Quantum Electronics, Vol QE-18, No. 4, Apr. 1982; "Wavelength-Selective Directional Coupler Mode of Non-identical Single-Mode Fibers", by Remigiers Zengerle et al, Journal of Lightwave Technology, Vol. LT-4, No. 7, Jul. 1986; and "Single-Mode Fiber Optic Directional Coupler", by R. A. Bergh et al, Electronic Letters, Vol. 16, pp. 260-261, Mar. 27, 1980.

Briefly, as described in the above referenced first publication, a length of optical fiber is securely fastened into a groove cut into a quartz block having parallel, polished faces. The surface of the substrate is ground and polished until the required proximity to fiber core is obtined. When sufficient material has been removed, two substrates are joined together and a liquid having a refractive index close to that of the fiber cladding is inserted between the substrates to form the coupler.

Light from a laser diode pump 58 is launched through a lens 60 located at the very end 62 of the doped amplifying fiber 44. A holographic grating 64 can be positioned within the amplifying fiber between the end 62 and the coupler 48 to reject an undesired mode form the laser diode pump by providing the required backscattering. The length of the end 46 is kept small and the concentration of the dopant in the end 46 is kept low to keep to a minimum the absorption of pump energy in the end 46 of the amplifying fiber 44.

Dichroic coupler 48 is constructed to couple substantially all of the signal in the transmission fiber 40 to the amplifying fiber 44. The dichroic coupler 48 is also constructed to couple substantially none of the pump signal from the pump to the transmission fiber 40. Thus, the signal in the transmission fiber 40 is coupled into the amplifying fiber 44; and the energy from the pump 58 which enters the end 46 of the fiber passes through the dichroic coupler 48 to the fiber 44. Only a very small portion of the energy from the pump 58 passes through the dichroic coupler 48 to the fiber 40.

At the other end 50 of the amplifying fiber 44, the dichroic coupler 56 is designed to couple substantially all of the signal energy from the amplifying fiber 44 into the second section 52 of the transmission fiber.

Referring to dichroic coupler 48, the small amount of signal energy in the transmission fiber that passes straight through the dichroic coupler to the end 42 can be used for monitoring the operation of the system. In a similar manner, the signal at the end 54 of the second section 52 of the transmission fiber which is received from the amplifying fiber 44 via coupler 56 can be used for monitoring purposes.

Normally, a transmission fiber has a mode diameter which is different from that of the core diameter of an Erbium doped amplifying fiber. By coupling the Erbium doped amplifying fiber to the transmission fiber through an evanescent field type of coupler rather than through a direct in line core-to-core splice, the coupling losses are reduced substantially. In addition, conmmercially available high power pump lasers have several longitudinal modes where the pump modes generated occur at the pump wavelength of 1.48 μm and also occur at the signal wavelength which can be between 1.50 to 1.55 μm. With this invention, the evanescent field coupler, in addition to operating as an efficient coupler between the Erbium doped amplifying fiber and the transmission fiber, also functions as a bandpass fiber to reject the modes of the pump signal which have wavelengths within the signal band 1.50-1.55 μm from reaching the amplifying fiber. In operation, those signals generated by the laser diode pump which have a wavelength between 1.50 and 1.55 μm are shunted from the amplifying fiber 44 to the first section 40 of the transmission fiber by the dichroic coupler 48. The longitudinal modes having wavelengths between 1.50 and 1.55 μm which are generated by the pump laser diode, if not shunted by the dichroic coupler 48 from fiber 44 to fiber 40, would be a source of undersirable noise.

In addition, by coupling a monitor to the end 42 of fiber 40, and another monitor to the end 54 of fiber 52, the signal on fiber 40 can be monitored both before and after amplification.

In some situations, additional amplification of the input signal may be desired. This can be effected by coupling a backup laser diode pump 66 to the end 50 of amplifying fiber 44. The backup laser diode pump 66 and the laser diode pump 58 can operate simultaneously to provide increased amplification and reduce power requirement for each pump diode, or they can operate sequentially, the backup laser diode pump 66 becoming operative only when the laser diode pump 58 decreases in output power or becomes inoperative.

Referring further to FIG. 4, structure is illustrated for providing automatic gain control to the laser diode pump 58. Specifically, a transmissison fiber 68 is coupled via a dichroic coupler to the end 50 of fiber 44. Dichroic coupler 70 is constructed to couple amplified energy from fiber 50 to fiber 68. An optical detector 72 which converts an optical signal to an electrical signal, is positioned to detect the signal present in fiber 68. The electrical signal generated by optical detector 72 is coupled to an input terminal of an amplifier 74, the output of which is coupled to control the operation of laser diode pump 58. In a similar manner, the operation of pump 66 can be controlled to provide automatic gain control.

In the embodiment disclosed above, the laser diode pump 58 or 66 generates a primary signal having a wavelength of 1.48 μm. It is to be noted, however, that the diode pump can generate a signal having a wavelength of 0.98 μm. When a laser diode pump which generates a signal having a wavelength of 0.98 μm is used, the problems associated with having undesired modes in the 1.50 to 1.55 μm wavelength are not normally present. The use of a laser diode pump which operates at 0.98 μm, requires an Erbium doped amplifying fiber having a different mode diameter. However, by using the dichroic coupler, the coupling losses between the transmission fiber and the amplifying fiber are minimal regardless of the mode diameter of the transmission fiber and the mode diameter of the amplifying fiber.

We claim:

1. An optical communication system comprising a transmission fiber for transmitting an optical signal, said transmission fiber having a first mode diameter, a rare earth doped optical amplifying fiber having a second mode diameter wherein said first diameter and second diameter are unequal, a source of pump energy for pumping said rare earth doped optical amplifying fiber, a dichroic coupler comprising two fibers, one fiber being the transmission fiber and the other fiber being the rare earth doped optical amplifying fiber, said fibers of the coupler juxtaposed to couple the signal in the transmission fiber to the amplifying fiber and to inhibit the coupling of pump energy in the amplifying fiber to the transmission fiber.

2. The optical communication system of claim 1 comprising a second dichroic coupler comprising two fibers, one fiber being the transmission fiber and the other fiber being the rare earth doped optical amplifying fiber, said fibers juxtaposed to couple the signal in the amplifying fiber to the transmission fiber and to inhibit the coupling of pump energy in the amplifying fiber to the transmission fiber, said first dichroic coupler coupled adjacent to one end of said amplifying fiber and said second dichroic coupler coupled adjacent to the other end of said amplifying fiber.

3. The optical communication system of claim 2 wherein said rare earth doped optical amplifying fiber comprises erbium.

* * * * *